May 3, 1949.   A. W. GOLDSBARRY ET AL   2,468,872
DISTILLING HEAD
Filed Jan. 1, 1945

INVENTORS.
Albert W. Goldsbarry
BY Howard S. Martin

Patented May 3, 1949

2,468,872

UNITED STATES PATENT OFFICE 2,468,872

DISTILLING HEAD

Albert W. Goldsbarry, Northbrook, and Howard S. Martin, Glenview, Ill., assignors to The Pure Oil Company, Chicago, Ill., a corporation of Ohio Application January 1, 1945, Serial No. 570,978

4 Claims. (Cl. 202—185)

This invention relates to improvement in a glass distilling head for use in connection with laboratory distillation apparatus.

In Patent No. 2,251,185 there is disclosed a reflux control apparatus for use on a fractional distilling column. The distilling head disclosed in the aforesaid patent has several disadvantages. The principal disadvantage is that the vapors from the distilling column enter the section surrounding the swinging funnel and are partially condensed and returned to the fractionating column without passing through the funnel so that it is not possible to accurately regulate the amount of reflux liquid which is returned to the distilling column. Another disadvantage is that the funnel is supported on glass lugs formed on the inside of the fractionating head which tend to wear and interfere with the free swinging of the funnel. If the product being subjected to distillation contains gum formers, gum has a tendency to deposit on the supporting lugs and around the studs which support the funnel, thereby further interfering with the free operation of the funnel. A further objection to the distilling head shown in the aforesaid patent, is that it is made in one piece with the result that breakage of a portion thereof requires replacement of the whole head. Still another objection to the distilling head shown and described in the aforesaid patent is that it is provided with a stopcock in the pressure equalizer line 17 which must be turned in order to draw off reflux from the distilling head. If the stopcock is inadvertently turned in the wrong direction, the pressure balance between the top and the bottom of the head is destroyed.

Figure 1:
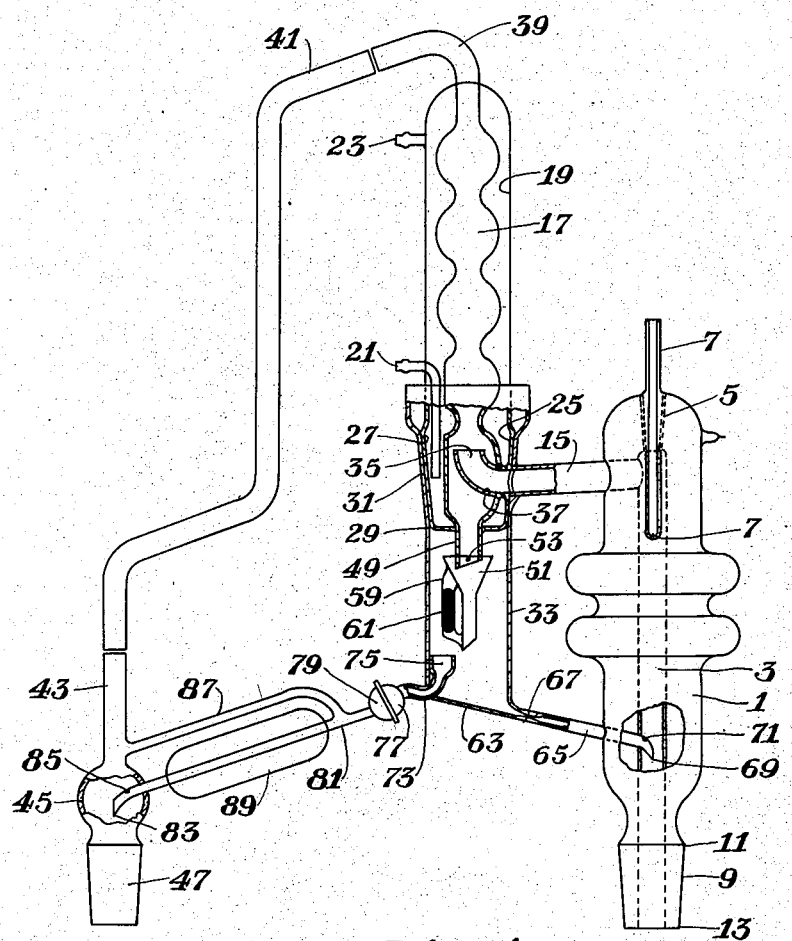
Figure 2:
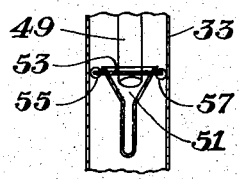

The object of our invention is to provide a distilling head which obviates the aforesaid disadvantages as well as other disadvantages which will become apparent from the following description and accompanying drawing of which Figure 1 is a diagrammatic, elevational view of a distilling head constructed in accordance with our invention, and Figure 2 is a fragmentary detail of the swinging funnel forming part of the apparatus, in diagrammatic, elevation looking at the apparatus from an angle 90° from the direction in which Figure 1 is viewed.

Referring to the drawing, numeral 1 indicates an annular evacuated jacket constructed around an axial vapor passage 3, the upper end 5 of which is restricted and slightly tapered outwardly from bottom to top. The surface of the tapered portion 5 is ground in order to snugly accommodate and form a leak-proof joint with a thermocouple or thermometer well 7 extending downwardly into the passageway 3 to a point below the point of vapor exit therefrom. A thermocouple or thermometer (not shown) is adapted to be inserted into the thermocouple well in order to measure the temperature of the vapors at the point where they leave the passageway 3.

The bottom 9 of the jacket 1 is circular in cross-section and gradually tapers inwardly from the point 11 to the point 13. The surface of the portion 9 is ground in order that it may form a vapor-tight joint when inserted into the top of a conventional glass fractional distillation column.

A horizontally disposed tube 15 connects the upper end of the passageway 3 at a point immediately below the restricted upper end 5 with a condenser 17. The tube 15 is fused to the wall of both the passageway 3 and the jacket 1. The condenser 17 is enclosed in a water jacket 19 provided with water inlet 21 and water outlet 23. Obviously, other cooling mediums beside water may be used in the jacket 19. The lower end 25 of the jacket 19 is cylindrical in cross-section, tapering gradually inwardly from the point 27 to the bottom thereof 29. The outer surface of the portion 25 is ground in order to snugly fit in the upper end 31 of a condensate receiving section 33 and make a vapor-tight seal therewith. One end of the tube 15 is fused to the wall of the upper end 31.

The lower portion of the condenser 17 is formed with an up-turned tube 35 of same cross-section as the tube 15 and is aligned therewith to form a continuous passageway from the axial passageway 3 to the condenser 17. The tube 35 has a small hole 37 at the bottom thereof in order to permit any condensate which collects therein to escape and drop into the bottom of the condenser 17.

The upper end of the condenser 17 is formed with a tube 39 which in turn is connected by means of neoprene tubing or other suitable tubing to the pressure equalizing line 41. The bottom of the pressure equalizing line 41 is in turn connected to the upper end of tube 43 by means of neoprene tubing or other suitable connection. The lower end of tube 43 has an enlarged portion 45 and a ground glass fitting 47 adapted to be inserted into a receiver (not shown) for collection of gas and condensate so that the fitting 47 makes a vapor-tight joint with the receiver.

The bottom of the condenser 17 is formed with an open-ended downwardly extending tubular portion 49 extending below the bottom 29 of the portion 25 of the jacket 19. A funnel 51 is supported immediately below the bottom of the tubular portion 49 by means of a non-corrosive and preferably non-magnetic, metallic pin 53 passing horizontally through holes adjacent the bottom of the tubular portion 49 and adjacent the upper lip of the funnel 51. The outer ends of the pin 53 may be provided with glass beads 55 and 57 slipped thereon to keep the funnel centered in place. The funnel 51 is adapted to swing on the pin 53. The funnel 51 is formed with a side-arm 59 containing a core 61 of soft iron or other metal or alloy susceptible to magnetic impulses.

The bottom 63 of the condensate receiving section 33 is inclined and is formed integrally with an inclined tube 65 extending into the passageway 3 at a point below the bottom of thermometer well 7 in order to permit return of condensate through the passageway 3 and thence, to the distilling column. The tube 65 has a narrow portion 67 adapted to hold liquid therein by capillary attraction and prevent passage of vapor from the passageway 3 through the tube 65 into condensate section 33. The end of the tube 65 extending into the passageway 3 is provided with a drip tip 69 and a vent 71 on the upper surface thereof in order to provide for smooth delivery of condensate through passageway 3. The tube 65 is fused to the walls of both passageway 3 and jacket 1.

The section 33 is also provided at its bottom and at a point diametrically opposite the point connected to the tube 65, with a bent tube 73 having an open widened upper end 75 inside the section 33 adjacent the wall thereof and a short distance below the bottom tip of the funnel 51. The tube 73 is fused to the wall of the section 33. The tube 73 is bent to form a trap so that condensate collecting therein will form a seal. The outer end of the tube 73 is formed integrally with a ground glass ball joint 77 adapted to fit into a receiving jacket 79 which is in turn integrally connected to the end of an inclined tube 81, the lower end of which extends into the enlarged portion 45. The end of the tube 81 extending into the enlarged portion 45 is formed with a drip tip 83 and a vent 85 on the upper side thereof in order to provide for smooth flow of liquid product into the collecting vessel. Another tube 87 connects the tube 81 at a point adjacent the joint 79 with the tube 43 immediately above the enlarged portion 45. A cooling jacket 89 is provided around tube 81 through which a cooling medium may be circulated in order to prevent evaporation of any portion of the condensate withdrawn through the tube 81.

As in the aforesaid Patent No. 2,251,185, an electromagnet (not shown) is provided outside condensate section 33 opposite the side-arm 59 of the funnel in order to swing the funnel as required at definite intervals of time. Any suitable timing device may be provided to regulate or vary reflux ratio. For example, if a reflux ratio of 4 to 1 is desired, a device will be provided so that in 12 seconds the funnel will be permitted to hang vertically, in the position shown in the drawing, so that reflux from the condenser will pass through tube 65 back to the fractionating column, and then the funnel will be swung by energizing the magnet so that for the next three seconds the lower tip of the funnel is directly above the widened portion 75 of the tube 73 so that the condensate passes to the collector not shown.

As can be readily understood from the foregoing description and the accompanying drawing, temperature of the vapors leaving the distillation column is measured before they leave the vacuum jacketed vertical passageway 3 so that an accurate reading of the actual temperature can be obtained before any cooling effect occurs. Furthermore, it will be seen that the vapors enter directly into the condenser without any opportunity to undergo partial condensation prior thereto. Thus, the possibility of a portion of the vapor condensing as it leaves the distillation column and flowing back into the distillation column without passing through the funnel is avoided. By injecting the vapors directly into the condenser above the funnel, heating of the funnel is avoided with the consequent elimination of partial vaporization of the condensate in the funnel which inevitably results where a hot atmosphere is maintained around the funnel. By suspending the funnel from the bottom of the condenser tube, a simplified construction is provided which permits easy operation of the funnel. By making the head in separate parts ease of packing for shipping purposes is provided and the apparatus can be readily repaired in the event the funnel gets out of order. The apparatus may be separated at points other than those described and illustrated by providing vapor tight joints at the points of separation. Moreover, breakage of one part does not necessitate replacement of the entire head. The elimination of the stopcock in the pressure equalizing line avoids the likelihood of inadvertently leaving the stopcock in closed position and disturbing the pressure balance in the distilling head.

By means of the improved distilling head shown and described, it is possible to obtain more efficient fractionating of laboratory samples and more accurate analysis thereof.

It is claimed:

1. A glass distilling head comprising, an insulated vapor passageway adapted to fit tightly on the top of a fractional distilling column, a condenser having a condensate outlet at the bottom thereof, a condensate receiving section below said condensate outlet and connected to said condenser means for passing vapor from said passageway directly to the bottom of said condenser above said outlet and bypassing said condensate receiving section, a pressure equalization line connecting the top of said condenser to said condensate receiving section a swingable funnel in said condensate receiving section positioned to permit the entire condensate from said condenser to pass therethrough, means for returning condensate from said funnel to the fractional distilling column, means to conduct condensate from said funnel to a collecting vessel, means to change the position of said funnel in order to permit said funnel to deliver condensate to either said vessel or to said fractional distilling column.

2. A distilling head in accordance with claim 1 in which the condensate receiving section is separate from the condenser and vapor passage and the condensate receiving section, vapor passageway and condenser are provided with vapor-tight joints adapted to fit together.

3. A glass distilling head for a fractional distilling column comprising an evacuated insulating jacket adapted to fit tightly in the top of said column and form a vapor tight seal therewith, a vertical vapor passageway through said jacket connected to the top of the distilling column, a condenser having a condensate outlet at the bottom thereof the lower part of said condenser being connected above said outlet by a horizontal vapor passageway to the upper portion of said vertical passageway, a thermometer well in the top of said vertical passageway extending below the point at which the horizontal passageway joins the vertical passageway, a condensate receiving section integral with said vapor passageway but separate from said condenser and provided with means for removably mounting the bottom of said condenser in the top of said section by means of a vapor-tight seal, a funnel swingably supported in said condensate receiving section from the bottom of said condenser directly below said outlet in such position as to cause the entire condensate from the condenser to pass through said funnel, means to convey condensate from said funnel to either said distilling column or to a collecting vessel and means for equalizing the pressure between said condenser and condensate receiving section.

4. A glass distilling head comprising, an insulated vapor passageway to fit tightly on the top vapor exit of a fractional distilling column, a condenser having a condensate outlet at the bottom thereof, a condensate receiving section below said condensate outlet and connected to said condenser, means for passing vapor from said passageway directly to the bottom of said condenser above said outlet and bypassing said condensate receiving section, a swingable funnel in said condensate receiving section positioned to permit the entire condensate from said condenser to pass therethrough, means for returning condensate from said funnel to the fractional distilling column, means to conduct condensate from said funnel to a collecting vessel, means to change the position of said funnel in order to permit said funnel to deliver condensate to either said vessel or to said fractional distilling column.

ALBERT W. GOLDSBARRY.
HOWARD S. MARTIN.

REFERENCES CITED

The following references are of record in the file of this patent:

UNITED STATES PATENTS

| Number | Name | Date |
|---|---|---|
| 2,251,185 | Carter | July 29, 1941 |
| 2,383,377 | Evans | Aug. 21, 1945 |

OTHER REFERENCES

Industrial & Engineering Chemistry, Anal. ed., vol. 2, page 187, 1930.